United States Patent [19]

Cooley et al.

[11] 3,862,147
[45] Jan. 21, 1975

[54] MALEIC ANHYDRIDE PROCESS

[75] Inventors: Stone D. Cooley; Andrew K. Schwartz, Jr., both of Houston, Tex.

[73] Assignee: Petro-Tex Chemical Corporation, Houston, Tex.

[22] Filed: Aug. 25, 1972

[21] Appl. No.: 283,639

[52] U.S. Cl. ... 260/346.8 M, 260/485 R, 260/533 R
[51] Int. Cl. ............................................ C07c 57/14
[58] Field of Search ..... 260/346.8 M, 533 R, 485 R

[56] References Cited
UNITED STATES PATENTS
3,527,677   9/1970   Harpring ............................ 260/533

Primary Examiner—Henry R. Jiles
Assistant Examiner—Bernard I. Dentz
Attorney, Agent, or Firm—N. Elton Dry

[57] ABSTRACT

Dehydration of maleic acid utilizing monohydric alcohols as a dehydration or entraining agent. A hydrocarbon is oxidized to maleic anhydride and reactor effluent scrubbed with water to form aqueous composition of maleic acid which is dehydrated with n-butanol in a distillation column. Mixture of n-butanol and water is taken overhead from column.

5 Claims, No Drawings

MALEIC ANHYDRIDE PROCESS

Maleic anhydride is currently produced by the oxidation of hydrocarbons such as benzene, n-butene, butadiene-1,3 or n-butane. Maleic anhydride is obtained by oxidizing the hydrocarbon feed at a high temperature and over a suitable catalyst to produce a gaseous effluent of maleic anhydride together with impurities. The gaseous effluent is cooled and scrubbed with water to produce a crude solution of maleic acid. The aqueous solution of maleic acid is then fed to dehydration - distillation column in which the maleic acid is dehydrated by contacting with a volatile water insoluble entraining or azeotroping agent such as xylene which does not undergo chemical reaction in the system. The water and entraining agent are removed as overhead vapors and maleic anhydride is removed as bottoms. These processes for the oxidation of hydrocarbons to maleic anhydride, scrubbing of the maleic anhydride to produce an aqueous maleic acid solution and dehydration of the maleic acid solution to form maleic anhydride are known in the art and are described in Chemical and Engineering News 38, (28), 40, 1960; Encyclopedia of Polymer Science (1964); Kirk and Othmer Encyclopedia of Chemical Technology, 2nd. edition, Vol. 12, 828, Interscience (1967); U.S. Pat. Nos. 2,683,110 and 3,094,539. It has been an object of these processes to select entraining agents which did not react with the maleic acid or maleic anhydride. One of the disadvantages of this method of dehydration is that a significant amount of maleic anhydride is lost overhead with the water and entraining agent. Also it has been a frequent objective to reduce the amount of fumaric acid produced as a by-product during the dehydration and in particular it has been an object to reduce the amount of fouling in the dehydration column.

According to the present invention aqueous maleic acid solutions are dehydrated by utilizing as an entraining agent a monohydric alcohol. In this process the monohydric alcohol reacts with the maleic acid and a mixture of monohydric alcohol and water is taken off as a vapor. For many alcohols a minimum boiling azeotrope is formed with water and this azeotrope is taken off overhead. Some of the maleic anhydride in the stillpot of the column is in the form of esters which can be deesterified to form maleic anhydride or utilized as the ester. The esters are valuable products and thus both the dehydration and recovery of the maleic value in the stream and esterification can be accomplished simultaneously. The maleic and fumaric esters are known products and have been prepared and utilized for example as described in the Encyclopedia of Chemical Technology, Vol. 12, (Interscience, 1967), U.S. Pat. Nos. 2,644,009; 2,759,967; 2,766,273 and 3,418,363.

The monohydric alcohols employed may be varied depending on the process conditions in the dehydration column and may be such as primary, secondary or tertiary alcohols having from one to 18 carbon atoms with a preferred range being from 3 and preferably 4 to 18 carbon atoms. A particular group of monohydric alcohols have 4 to 8 carbon atoms. Normally, the tertiary alcohols are less desirable and the primary alcohols have given excellent results. Preferably the alcohol will not be completely soluble with water and also preferably the alcohol is one which will form a minimum boiling azeotrope with water under the conditions of dehydration. Saturated alcohols are preferred in order to avoid reactivity due to the unsaturation in unsaturated alcohols. Alcohols which can be separated by distillation from maleic acid esters of the same alcohol have been advantageously employed. Generally, the alcohols will have boiling points of from about 100° to 200°C. at atmospheric pressure. Examples of suitable alcohols are 1-propanol, 1-butanol, 2-butanol, 2-buten-1-ol, 2methyl-1-propanol, 1-hexanol, 1-octanol, 2-ethyl-1 hexanol, isooctyl alcohol, 1-decanol, isotridecyl alcohol, mixtures thereof and the like. Examples of mixtures of alcohols would be a mixture of 1-butanol and 2-butanol.

According to this invention the preparation and recovery of maleic anhydride or maleic acid may be accomplished by a process comprising (1) oxidizing a hydrocarbon which is a precursor of maleic anhydride to form a reactor effluent comprising maleic anhydride (2) scrubbing the reactor effluent with water to obtain a crude aqueous composition comprising maleic acid, (3) reacting the crude aqueous mixture or solution with a monohydric alcohol at a temperature at least as high as that at which boiling of the composition occurs while removing water and alcohol and maleic from the reaction, (4) recovering the maleic product.

One of the objects of this invention is to prepare maleic anhydride by improved dehydration technique and to obtain products that are essentially water free. A principal advantage of this invention is it is possible to obtain a relatively pure product by a simplified purification scheme. According to the prior art it was necessary to first dehydrate the crude aqueous maleic solution and thereafter purify the maleic anhydride prior to e.g. use of the maleic anhydride. According to the prior art processes for producing maleic anhydride a considerable amount of maleic contents of the scrubber solution was converted to fumaric acid or was lost along with the process water. According to this invention the production of fumaric acid is minimized, and further it has been discovered that the mixed alcohol esters of maleic acid and fumaric acid can be advantageously utilized. Using the process of this invention high yields of maleic are produced at a low cost and pollution problems from the process are reduced. Maleic loss to the process water are reduced because the maleic reacts with the alcohol and less maleic goes overhead with the water as compared to the prior art processes for dehydration of maleic acid to maleic anhydride. Another advantage of this invention is that less energy is required for dehydration because the reaction with the alcohol is exothermic.

The crude maleic anhydride can be obtained by oxidation of hydrocarbons as is known in the art. The feed may be e.g. benzene, n-butene, butadiene-1,3, n-butane and mixtures thereof. The reactor effluent is then scrubbed with water to form the aqueous maleic acid composition. It is possible to condense a portion of the maleic anhydride prior to scrubbing. This scrubbing or contact of the reactor effluent may be accomplished in any conventional manner and conventional equipment for gas/liquid mixing may be used such as scrubbers, turbo-absorbers, bubble or tray towers, absorbers, cascades, injector systems for recirculation through nozzles or towers and the like. Conventional equipment used for the scrubbing of maleic acid may be employed. At atmospheric pressure typical temperatures of the water will be about 20°C. to 90°C. with a preferred range being about 40°C to 60°C. Both higher and lower temperatures may be used.

The product discharge from the water scrubber contains at least 40 weight percent water and preferably contains about 30 to 60 weight percent of maleic acid, with a preferred range being from about 35 – 45 weight percent maleic acid. The resultant maleic acid solution will generally contain impurities such as fumaric acid, benzene derivatives, formaldehyde and related impurities depending upon the particular hydrocarbon fed to the reactor. Weak acids such as aliphatic monocarboxylic acids of 2 to 6 carbon atoms may be present. Aliphatic aldehydes of 2 to 6 carbon atoms may be present and there may be a variety of mixed tarry polymers such as from about 0.05 to 5 weight percent of the maleic acid.

The maleic acid composition may then be dehydrated and recovered according to this invention. If desired, the scrubber water may be pretreated to adjust for temperature or pressure or to remove certain impurities. However, it is one of the advantages of this invention that the maleic acid scrubber water can be conducted directly to the dehydration and recovery process. In the dehydration process the maleic acid solution is contacted with a monohydric alcohol at a temperature at least as high as the boiling point of the aqueous composition and it is essential that water or a water azeotrope be boiled off. The boiling points of course will be influenced by the pressure under which dehydration takes place. If desired the monohydric alcohol may be premixed in the stillpot prior to dehydration and reaction may take place at this time. A preferred method of conducting the invention is to continuously feed maleic acid composition and the monohydric alcohol to a distillation column with the maleic acid composition being fed at a point lower than the monohydric alcohol. Preferably, the maleic acid composition will be fed to the upper two-thirds of the column but at a point below the very top of the column for example not on the top plate if a plate column is used. The maleic acid composition may be fed to the stillpot but generally better results are obtained if the maleic acid composition is fed in the middle one-third of the distillation column. Monohydric alcohol may be charged to the stillpot prior to startup and may be added during the run. In the distillation column a mixture of monohydric alcohol and water comes off overhead and this may be separated by cooling in a condenser and decanting with the monohydric alcohol being recycled to the column and the water from the decanter being discharged. With most alcohols there will be some water present in the monohydric alcohol return to the column and also some monohydric alcohol in the water phase which is discharged. The water layer from the decanter can be separated such as by distillation to recover monohydric alcohol which then may be recycled to the process.

If desired to promote the reaction of the alcohol with maleic an esterification catalyst such as sulfuric acid or other esterification catalyst may be used. However, excellent separations can be achieved in the absence of such a catalyst and, therefore, may suitably not be used.

During dehydration it is a feature of this invention that an excess of monohydric alcohol based on the combined mols of maleic acid and fumaric acid be employed. At least 2 mols of monohydric alcohol are preferably employed for each mol of maleic acid and fumaric acid but better results are obtained when this ratio is at least 2.2.

The pressure in the dehydration reaction may be varied and may be sub-atmospheric, atmospheric, or above atmospheric pressure. According to one method of operation the dehydration can be conducted at about atmospheric pressure and thereafter the pressure in the stillpot and the column can be increased to greater than atmospheric pressure such as from 25 to 100 psig to drive the separation to completion and cause further reaction between the maleic acid and the alcohol. The temperature in the stillpot and in the overhead from the dehydration column will vary depending upon the particular monohydric alcohol being employed but the temperature of the overhead from the column must be at least as high as the boiling point of the aqueous maleic composition being dehydrated under the particular pressure conditions. Preferably during dehydration the temperature in the stillpot will be between 100° and 230°C. The overhead temperature may be varied depending on the pressure and the components used but normally will be between about 80° and 200°C.

The maleic and/or fumaric product will be present in the stillpot for further purification or use. Preferably there will be present monohydric alcohol in the stillpot in excess of the stoichiometric amount of monohydric alcohol required to form the diesters of maleic acid or fumaric acid. Instead of continuously removing the product from a stillpot an alternate method is to operate the process as a batch process followed by separation of the product at the end of the process. Combinations of conditions and batch process techniques may be employed.

The dehydration column may be a fractionation tower such as a sieve plate, bubble cap or packed tower. Conventional equipment used for the dehydration of maleic acid compositions may be employed.

The following examples illustrate the invention and are not intended to limit the scope of the invention. All percentages are by weight unless expressed otherwise.

EXAMPLE 1

The feed to the dehydration process is crude maleic acid scrubber solution containing 40 percent maleic acid and prepared by scrubbing the effluent from a maleic anhydride reactor utilizing benzene as a feed. This scrubber solution is obtained by the general process described in U.S. Pat. No. 2,683,110.

The dehydration is conducted in a 4 inch internal diameter distillation column consisting of lower and upper sections separated by a feed section. The lower unit is a glass Oldersham 15 tray column. The upper unit is a 1.5 foot length of 4 inch diameter glass pipe containing 5 perforated stainless steel trays. The reboiler is a section of 6 inch internal diameter glass pipe 20 inches in length which contains a multi-tube heat exchanger constructed of ¼ inch diameter stainless steel tubing. Steam at 150 psig is piped to the heat exchanger. The condenser and head above the column is designed so that the condensed liquid passes through a condensing chamber where the water phase is decanted and separated. The alcohol phase is continuously returned to the column. The stillpot is initially charged with 1,700 g of n-butanol and heated to refluxing. 8,129 g of the 40 percent maleic acid solution is added to the column during 7.75 hours. The dehydration is conducted at atmospheric pressure. During the run 2,665 g of additional alcohol is added to the stillpot. The temperature of the overhead is about 94° to 98°C. during the run and the temperature of the stillpot is about 120° to 170°C. The crude product in the stillpot is refluxed for an additional 3.25 hours. The acid number of the product in the stillpot is 22.0. 5,602 g of product in the stillpot is obtained with the product containing some n-butanol. A 621.8 g aliquot portion of this product mixture is distilled to separate the products comprising maleic anhydride and water white dibutyl maleate. The acid number of the distillate is 5.5 to 6.9.

EXAMPLE 2

Apparatus and general procedure of Example 1 is used for Example 2. 3,799 g of n-butyl alcohol is added to the reboiler and heated to refluxing. 4,133 g of 41.61% crude aqueous maleic acid solution is fed to the column over a period of 2 hours. The crude product is refluxed for an additional 2 hours. 4,263 g of product is obtained. The acid number at this point is 95.0.

EXAMPLE 3

The procedure of Example 1 is repeated substituting an equivalent weight of 2-butanol as the alcohol instead of 1-butanol.

EXAMPLE 4

The procedure of Example 1 is repeated substituting a steel column having the same number of plates in each section and having the same diameter. The dehydration is conducted at a pressure of 10 p.s.i.g. utilizing the same number of moles of 1-hexanol instead of n-butanol.

The invention claimed is:

1. A process for the preparation of maleic acid or maleic anhydride comprising
   oxidizing a hydrocarbon which is a precursor of maleic anhydride to form a vaporous reactor effluent comprising maleic anhydride,
   scrubbing said vaporous reactor effluent with water to obtain an aqueous composition comprising maleic acid and fumaric acid with at least 40 weight per cent water,
   feeding said aqueous composition to the middle one-third of a refluxing distillation column having a temperature in the stillpot between 100° and 230°C.,
   feeding n-butanol in stoichiometric excess based on esterifiable acid to said column at a point higher in said column than the point of feed of the crude aqueous solution,
   taking off a vaporous overhead portion containing a mixture of said n-butanol and water having a temperature between about 80° and 200°C., and
   recovering a bottoms portion from the stillpot containing dehydrated maleic and fumaric acids, and esters of maleic and fumaric acids.

2. The process of claim 1 wherein the aqueous composition contains from about 35 to 45 weight percent maleic acid.

3. The process of claim 1 wherein the recovered maleic product is essentially water-free.

4. The process according to claim 1 wherein said bottoms are fractionated to separate the acid component from the ester component.

5. The process according to claim 1 wherein the overhead n-butanol and water mixture is separated and the n-butanol is returned to the distillation column.

* * * * *